United States Patent [19]
Kisaichi et al.

[11] Patent Number: 6,049,179
[45] Date of Patent: Apr. 11, 2000

[54] HIGH-PRESSURE DISCHARGE LAMP LIGHTING APPARATUS

[75] Inventors: Hiroyasu Kisaichi, Tokyo; Masatomi Asayama; Fumitake Oowada, both of Kanagawa, all of Japan

[73] Assignees: Mitsubishi Denki Kabushiki Kaisha, Tokyo; Mitsubishi Electric Lighting Corporation, Kamakura; Osram-Melco Limited, Yokohama, all of Japan

[21] Appl. No.: 09/045,906

[22] Filed: Mar. 23, 1998

[30] Foreign Application Priority Data

Nov. 28, 1997 [JP] Japan ................................. 9-327716

[51] Int. Cl.[7] .................................................. H05B 37/02
[52] U.S. Cl. ......................... 315/307; 315/224; 315/247; 315/DIG. 2
[58] Field of Search .................................. 315/307, 224, 315/208, DIG. 5, DIG. 2, 247

[56] References Cited

U.S. PATENT DOCUMENTS 5,491,388  2/1996  Nobuyuki et al. ...................... 315/308

FOREIGN PATENT DOCUMENTS 9-55296  2/1997  Japan .

*Primary Examiner*—David H. Vu
*Attorney, Agent, or Firm*—Oblon, Spivak, McClelland, Maier & Neustadt, P.C.

[57] ABSTRACT

To provide a high-pressure discharge lamp lighting apparatus which is adapted to be used in common for several kinds of AC voltages such as 100 V and 200 V, which is small in size, and which can secure good starting property with less circuit loss in use at any of the AC voltages, the apparatus is provided with a diode bridge for rectifying an AC voltage, an active filter for converting, with a high power factor, an AC voltage into a DC voltage, a current limiting circuit for controlling the current to be made to flow in the high-pressure discharge lamp, an inverter for converting a DC voltage into a low-frequency AC voltage, a high-voltage pulse circuit for generating a high-voltage pulse for starting the high-pressure discharge lamp, and a control circuit for controlling the active filter, the current limiting circuit, the inverter, a discharge-lamp voltage detecting circuit, a discharge-lamp current detecting circuit and the high-voltage pulse circuit.

8 Claims, 5 Drawing Sheets

HIGH-PRESSURE DISCHARGE LAMP LIGHTING APPARATUS

BACKGROUND OF THE INVENTION

The present invention relates to a high-pressure discharge lamp lighting apparatus adapted to be used in common for several kinds of AC voltages such as 100 V and 200 V.

Generally, an electric appliance of a high power-factor is required so that the electric appliance does not exert any bad influence on equipments in the electric power system used.

In order to make the power factor of an electric appliance high, it is general to use a boosting circuit called "active filter" for boosting an input voltage to a value not smaller than the maximum value of a source AC voltage.

For example, in the case of an input of 200 V, its maximum value is $200 \times 2^{1/2} = 282$ V. Accordingly, if the input voltage is boosted to about 350 V by using an active filter in this case, the power factor is made higher. In the case of an input of 100 V, the input voltage is $100 \times 2^{1/2} = 141$ V. Accordingly, if the input voltage is boosted to about 180 V by using an active filter in this case, the power factor is made higher.

In the case of an appliance adapted to be used in common for 100 V/200 V, the input voltage is, however, boosted to about 350 V by an active filter even when the appliance is used with AC 100 V. Since the excessive boosting increases the loss in the active filter portion, the conversion efficiency in use with AC 100 V is worsened in comparison with the conversion efficiency in use with AC 200 V. The lighting apparatus becomes large-sized and expensive because it must be equipped with a radiation fin corresponding to the low conversion efficiency in use with 100 V.

As a conventional apparatus to solve this problem, a discharge lamp lighting apparatus is disclosed, for example, in JP-A-9-55296.

In the disclosed apparatus, the boosted voltage in loaded-state of the active filter in the case of an input of 100 V is reduced to a value lower than that in the case of an input of 200 V in order to obtain the same conversion efficiency even in use with 100 V as that in use with 200 V.

However, the apparatus according to JP-A-9-55296 has a problem that the starting property is lowered in use with 100 V.

The reason why the starting property is lowered will be described with reference to FIG. 6. FIG. 6 is a voltage-current characteristic graph of gas discharge appeared on p. 156 of "Lighting Handbook" (edited by the Illumination Engineering Institute of Japan, issued by OHM-sha Ltd., 1994/10/30) and shows a state of gas discharge from a point of time when a high-pressure discharge lamp starts to light to a point of time when the high-pressure discharge lamp is lighting stably.

As shown in FIG. 6, when the high-pressure discharge lamp starts to light, the high-pressure discharge lamp lighting apparatus applies a high-voltage pulse to the high-pressure discharge lamp through a high-voltage pulse generating circuit to bring the high-pressure discharge lamp into a Townsend discharge state. Then, a current is supplied to the high-pressure discharge lamp through an active filter, a current limiting circuit and an inverter so that the discharge state is shifted from glow discharge to arc discharge to thereby light the high-pressure discharge lamp stably.

As is apparent from FIG. 6, in order to shift the discharge state from the Townsend discharge to stable arc discharge, a voltage not smaller than the peak voltage P of glow discharge must be applied to the high-pressure discharge lamp to go beyond the glow discharge region. In the prior art, however, in use with 100 V, a load current is detected and the boosted voltage is reduced, so that the boosted voltage becomes too low in the glow discharge region to go beyond the glow discharge region and thereby causes light-extinguishing sometimes. Accordingly, the starting property is poor.

Furthermore, the discharge lamp impedance of the high-pressure discharge lamp is low just after the starting of lighting and increases with the passage of time to reach a stable state. If the voltage boosted by the active filter is reduced in the transient process of increasing the discharge lamp impedance, oscillation occurs in feedback control of the current limiting circuit so that the high-pressure discharge lamp may flick or may cause light-extinguishing.

In order to solve the above problems, it is an object of the present invention to provide a high-pressure discharge lamp lighting apparatus adapted to be used in common for several kinds of AC voltages such as 100 V and 200 V, in which not only good starting property can be secured in use at any voltage but also the apparatus can be reduced both in the circuit loss and apparatus size.

SUMMARY OF THE INVENTION

In order to achieve the above object, a high-pressure discharge lamp lighting apparatus according to an aspect of the present invention comprises: an active filter for boosting, with a high power factor, an input voltage applied from a rectifying circuit to thereby output a DC voltage; a current limiting circuit for changing the DC voltage outputted from the active filter and thereby outputting another DC voltage so as to keep electric power of a high-pressure discharge lamp constant; an inverter for converting the DC voltage outputted from the current limiting circuit into an AC voltage to thereby apply the AC voltage to the high-pressure discharge lamp; a discharge-lamp-current detecting circuit for detecting a current flowing in the high-pressure discharge lamp; a discharge-lamp-voltage detecting circuit for detecting the voltage of the high-pressure discharge lamp; and a control means for controlling the output voltage of the active filter in accordance with the input voltage applied to the active filter at the time when not only the discharge lamp current detected by the discharge-lamp-current detecting circuit becomes in a predetermined range but also the discharge lamp voltage detected by the discharge-lamp-voltage detecting circuit becomes in a predetermined range. According to this configuration, a good starting property of the discharge lamp can be secured and the apparatus can be reduced in both circuit loss and apparatus size.

Preferably, the control means reduces the output voltage of the active filter in accordance with the input voltage applied to the active filter. According to this configuration, a good starting property of the discharge lamp can be secured and the apparatus can be reduced in both circuit loss and apparatus size.

Preferably, the control means reduces the output voltage of the active filter with a predetermined time constant in accordance with the input voltage applied to the active filter. According to this configuration, the discharge lamp can be prevented from flickering or from light-extinguishing.

Preferably, the control means reduces the output voltage of the active filter on the basis of a graph of the output voltage corresponding to the input voltage applied to the active filter. According to this configuration, the power factor can be improved with the minimum boosting ratio, so that the loss in the active filter can be reduced.

DETAILED DESCRIPTION OF THE PREFERRED EMBODIMENTS

Embodiment 1

Figure 1:
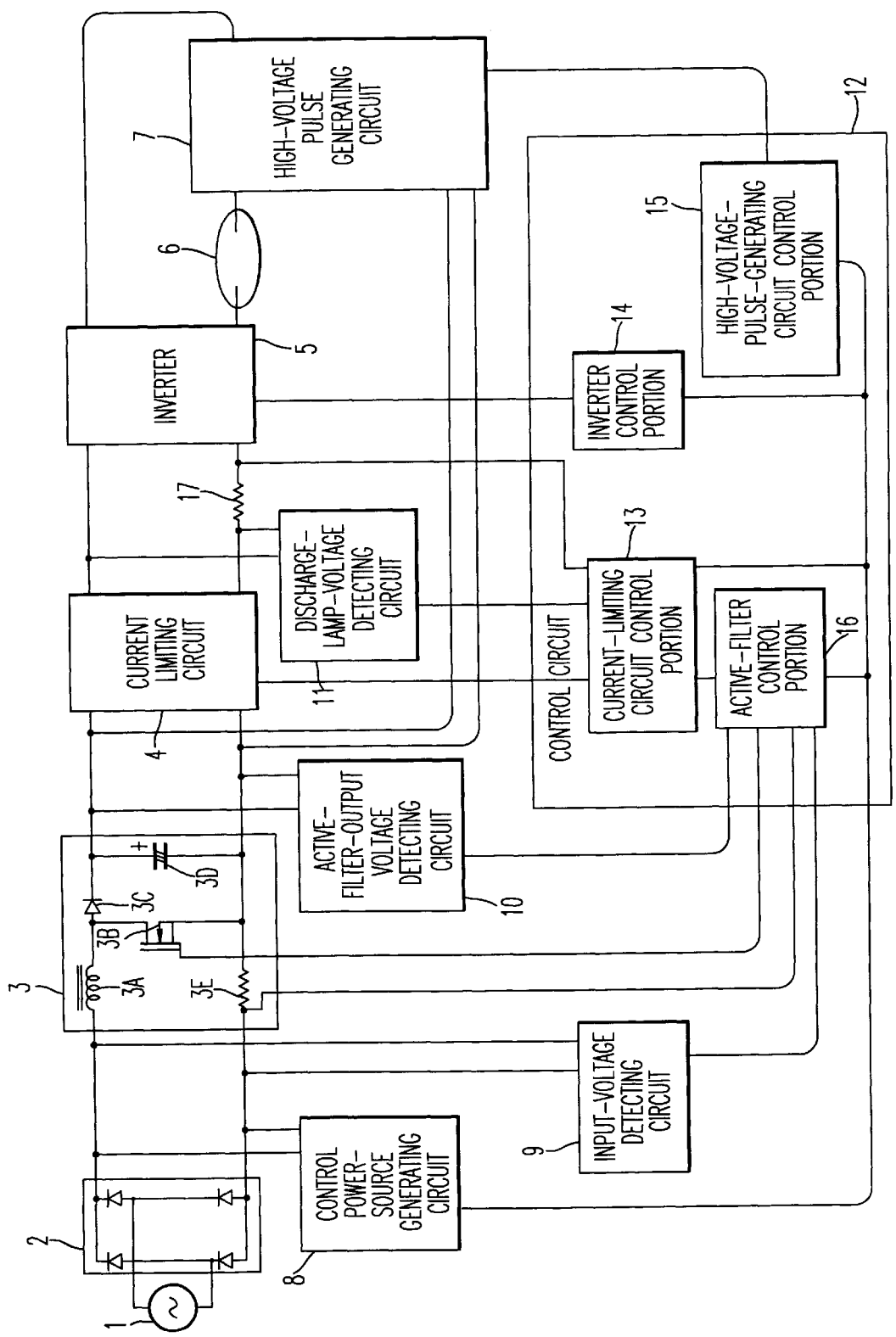
FIG. 1 is a block diagram showing a high-pressure discharge lamp lighting apparatus according to Embodiment 1 of the present invention.
Figure 2:
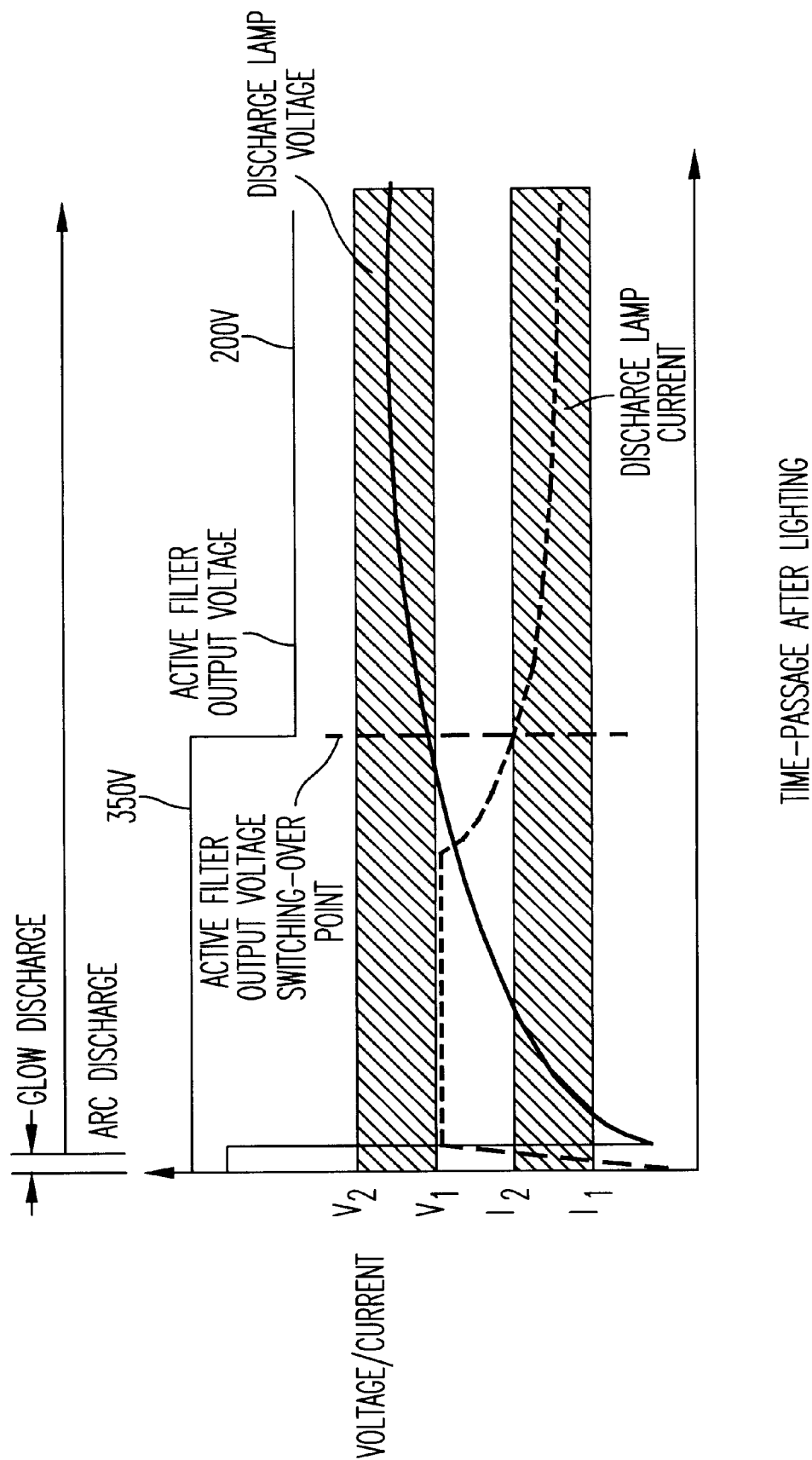
FIG. 2 is a graph for explaining the operation of the high-pressure discharge lamp lighting apparatus according to Embodiment 1 of the present invention.

FIG. 1 is a block diagram showing a high-pressure discharge lamp lighting apparatus adapted to be used in common for 100 V/200 V according to the present invention, and FIG. 2 is a graph for explaining the operation of this high-pressure discharge lamp lighting apparatus.

In FIG. 1, the reference numeral 1 designates an AC power source; 2, a rectifier circuit comprising a diode bridge for full-wave rectification of an AC voltage; 3, an active filter for converting the AC voltage from the rectifier circuit 2 into a DC voltage with a high power factor; 4, a current limiting circuit for controlling the current to be supplied to a high-pressure discharge lamp 6 so as to keep the electric power of the high-pressure discharge lamp 6 constant; 5, an inverter for converting the DC voltage into a low-frequency AC voltage; 7, a high-voltage pulse generating circuit for generating high-voltage pulses to start the high-pressure discharge lamp 6; and 12, a control circuit for controlling the active filter 3, the current limiting circuit 4, the inverter 5 and the high-voltage pulse generating circuit 7.

Further, the reference numeral 8 designates a control power-source generating circuit for generating a power source for the control circuit 12; 9, an input voltage detecting circuit for detecting the input voltage of the active filter 3 and for discriminating switching-over between 100 V and 200 V; 10, an active-filter-output-voltage detecting circuit for detecting the output voltage of the active filter 3; 11, a discharge-lamp-voltage detecting circuit for detecting the voltage of the high-pressure discharge lamp; and 17, a discharge-lamp-current detecting circuit for detecting the current of the discharge lamp.

The control circuit 12 is constituted by: an active-filter control portion 16 for controlling the active filter 3 on the basis of the respective outputs of the input voltage detecting circuit 9 and the active-filter-output-voltage detecting circuit 10; a current-limiting-circuit control portion 13 for controlling the current limiting circuit 4 on the basis of the respective outputs of the discharge-lamp-current detecting circuit 17 and the discharge-lamp-voltage detecting circuit 11; an inverter control portion 14 for driving and controlling the inverter 5; and a high-voltage-pulse-generating-circuit control portion 15 for controlling the high-voltage pulse generating circuit 7.

The active filter 3 is constituted by: a reactor 3a; a switching element 3b; a diode 3c; a capacitor 3d; and an input current detecting circuit 3e for detecting an input current.

The outline of the operation of the apparatus will be described below with reference to FIGS. 1 and 2. When the AC power source 1 is turned on, the control power-source-generating circuit 8 generates a control power source to start the operation of the control circuit 12. The active filter control portion 16 of the control circuit 12 then starts its operation to control the active filter 3 so that the active filter 3 boosts, with a high power factor, the input voltage supplied from the rectifier circuit 2 to thereby output a set DC voltage.

In the active filter 3, the switching element 3b is turned on/off on the basis of a high-frequency signal supplied from the active-filter control portion 16.

When the switching element 3b is in an ON-state, a current flows through the path from the reactor 3a to the switching element 3b.

In this occasion, electric energy is accumulated in the reactor 3a. When the switching element 3b is turned off, the energy accumulated in the reactor 3a is accumulated in the capacitor 3d through the diode 3c. Since the reactor 3a releases energy with a voltage higher than the input voltage when it releases the accumulated energy, the capacitor 3d is charged with the electric energy with a voltage higher than the input voltage.

The ON-time of the switching element 3b is controlled by the active-filter control portion 16 so that the waveform of the current detected by the input current detecting circuit 3e has a sine waveform synchronous with the waveform of the power-source voltage detected by the input voltage detecting circuit 9 and the output voltage of the active filter 3 detected by the active-filter-output-voltage detecting circuit 10 takes a set value.

In order to keep the electric power of the high-pressure discharge lamp 6 constant, the current-limiting-circuit control portion 13 determines a target discharge lamp current on the basis of the discharge lamp voltage read from the discharge-lamp-voltage detecting circuit 11 and controls the current limiting circuit 4 so that the discharge lamp current read from the discharge-lamp-current detecting circuit 17 corresponds with the target discharge lamp current.

The inverter control portion 14 drives the inverter 5 with a constant frequency so that the DC voltage outputted from the current-limiting-circuit control portion 13 is converted into a low-frequency AC voltage to apply to the high-pressure discharge lamp 6.

The high-voltage-pulse-generating-circuit control portion 15 operates the high-voltage pulse generating circuit 7 at the start to apply a high-voltage pulse to the high-pressure discharge lamp 6 so that dielectric breakdown of the high-pressure discharge lamp 6 is caused to thereby start the high-pressure discharge lamp 6.

The operation of the control circuit 12 will be described below with reference to FIG. 2. FIG. 2 shows the state of discharge of the high-pressure discharge lamp 6 with the passage of time after lighting, the state of the discharge lamp voltage, the state of the discharge lamp current, and the switching-over point of the output voltage of the active filter 3.

As shown in FIG. 2, without reducing the output voltage of the active filter 3 after glow discharge, the peak voltage 350 V of glow discharge is applied to the high-pressure discharge lamp 6 even in the arc discharge region. As a result, the discharge lamp voltage and the discharge lamp current go beyond the glow discharge region to enter the arc discharge region after lighting to thereby reach a stable region.

In FIG. 2, the stable region of the discharge lamp voltage is in a range from V1 to V2 and the stable region of the discharge lamp current is in a range from I1 to I2. When both the discharge lamp voltage and the discharge lamp current are near the stable region, a judgment is made as to whether the input voltage of the active filter 3 is 100 V or 200 V. In the case where the input voltage is 100 V, the output voltage of the active filter is reduced to 200 V when both the discharge lamp voltage and the discharge lamp current reach the stable region.

The ranges of the stable region of the discharge lamp voltage and the discharge lamp current vary in accordance with the wattage rating of the high-pressure discharge lamp. In the case of a 150 W high-pressure discharge lamp, the discharge lamp voltage is from 75 V to 130 V and the discharge lamp current is from 1A to 2A.

The discharge lamp voltage is low just after lighting, increases gradually, and then becomes stable when it reaches a value from 75 V to 130 V. While the discharge lamp voltage is increasing, the discharge lamp is in a transient state in which a metal enclosed in the inside of the discharge lamp is vaporizing. On the other hand, when the input voltage of the current limiting circuit 4 is reduced from 350 V to 200 V, the output current of the current limiting circuit 4 may drop instantaneously because the response of the active-filter control portion 16 cannot follow the reduction of the input voltage of the current limiting circuit 4. If such a phenomenon occurs when the discharge lamp is in a transient state, lighting may be discontinued. When the discharge lamp voltage, however, reaches 75 V (about 80% of the stable voltage), the discharge lamp voltage enters into the stable region. Accordingly, the discontinuation of lighting is prevented in spite of the more or less change of the current.

As described above, when the discharge lamp voltage detected by the discharge-lamp-voltage detecting circuit 11 and the discharge lamp current detected by the discharge-lamp-current detecting circuit 17 are in predetermined ranges respectively, the control circuit 12 controls the output voltage of the active filter 3 so that the output voltage of the active filter 3 is changed correspondingly to the input voltage of the active filter 3. Accordingly, even at the time of use of 100 V, good starting characteristic is obtained so that the same conversion efficiency as that at the time of use of 200 V is obtained.

The main operation of the high-pressure discharge lamp lighting apparatus according to the present invention will be described below in detail according to the flow chart of FIG. 3.

Figure 3:
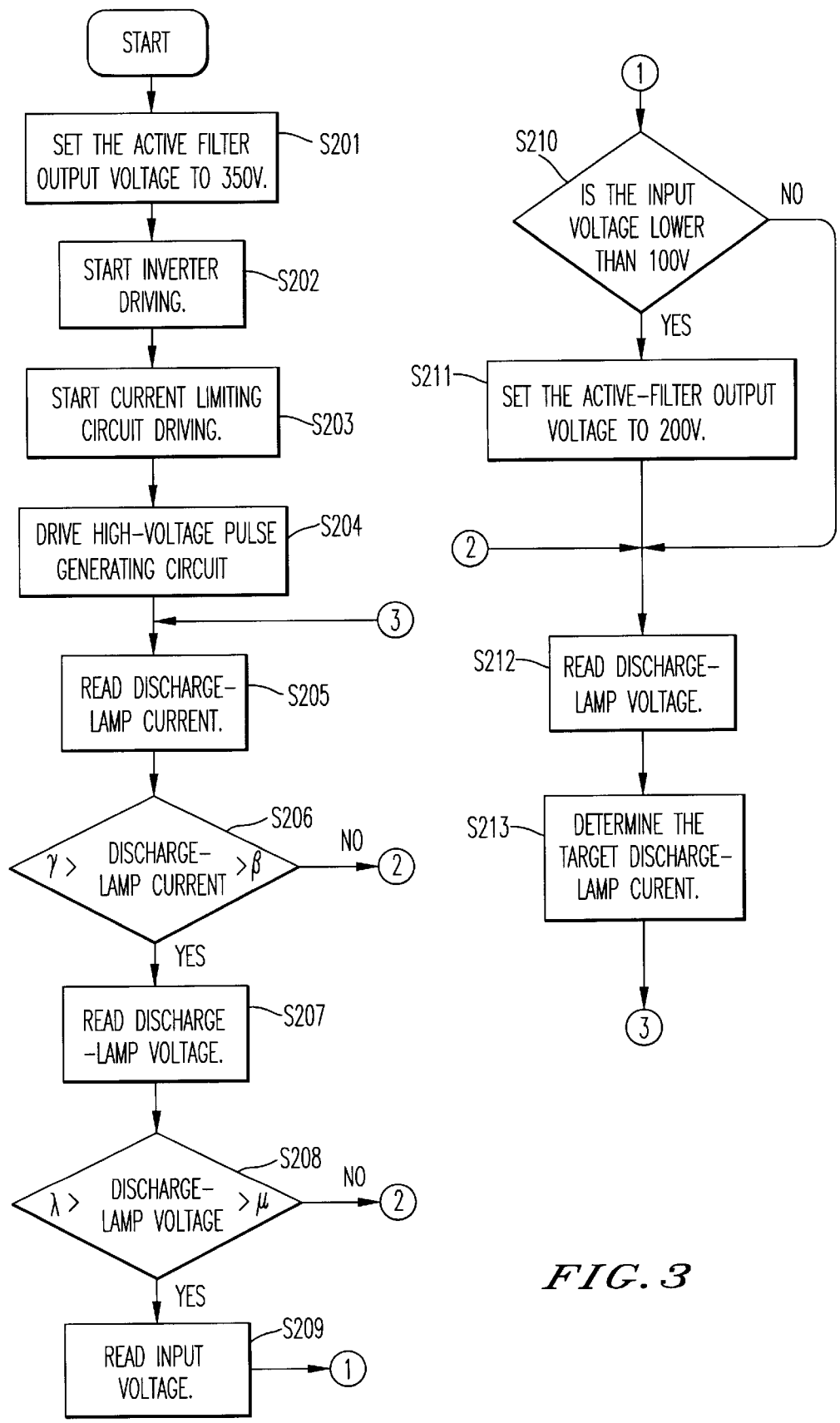
FIG. 3 is a flow chart showing the operation of the high-pressure discharge lamp lighting apparatus according to Embodiment 1 of the present invention.

After the AC source 1 is turned on to start the operation of the control power-source generating circuit 8, the operation shown in FIG. 3 is repeated until the AC power source 1 is turned off to stop the control power-source generating circuit 8.

First, in step S201, the output voltage of the active filter 3 is set to 350 V by the active-filter control portion 16. As a result, the active-filter control portion 16 controls the active filter 3 so that the output voltage of the active-filter-output-voltage detecting circuit 10 is 350 V. Next, in step S202, the inverter control portion 14 starts to drive the inverter 5. As a result, an AC voltage is applied to the high-pressure discharge lamp 6.

Next, in step S203, the current-limiting-circuit control portion 13 starts to drive the transistor of the current limiting circuit 4 with a predetermined pulse width.

As the high-pressure discharge lamp 6 in this occasion is in an unloaded state in which the high-pressure discharge lamp 6 is not yet lighted, the output voltage of the active filter 3 is outputted as it is from the current limiting circuit 4. Since this voltage is converted into an AC voltage by the inverter, an AC voltage of 350 V is applied between opposite ends of the high-pressure discharge lamp.

In step S204, the high-voltage-pulse-generating-circuit control portion 15 then drives the high-voltage pulse generating circuit 7. As a result, a high-voltage pulse is applied to the high-pressure discharge lamp, so that tile dielectric breakdown of the high-pressure discharge lamp 6 is caused and a current begins to flow in the high-pressure discharge lamp.

As the output voltage of the active filter 3 in this occasion is still set to 350 V so that an AC voltage of 350 V is applied also to the high-pressure discharge lamp, the high-pressure discharge lamp does beyond the glow discharge region shown in FIG. 2 and shifts to arc discharge.

In step S205, the current-limiting-circuit control portion 13 reads the discharge lamp current outputted from the discharge-lamp-current detecting circuit 17. In step S206, a judgment is made as to whether the discharge lamp current thus read is in a predetermined range or not.

When the discharge lamp current is in the predetermined range, the situation of the routine goes to step S207.

In the step S207, the current-limiting-circuit control portion 13 reads the discharge lamp voltage from the discharge-lamp-voltage detecting circuit 11. In step 208, a judgment is made as to whether the discharge lamp voltage thus read is in a predetermined range or not. When the discharge lamp voltage is in the predetermined range, a decision is made that the discharge lamp has reached the stable region and the situation of the routine goes to step S209, because both the discharge lamp current and the discharge lamp voltage are in the predetermined ranges, respectively.

In the step S209, upon reception of the information indicating that both the discharge lamp current and the discharge lamp voltage are in the predetermined ranges from the current-limiting-circuit control portion 13, the active-filter control portion 16 reads the input voltage to the active filter 3 from the input-voltage detecting circuit 9, and the input voltage is checked in step S210.

When the input voltage is a voltage not larger than 110 V, the output voltage of the active filter 3 is reduced from 350 V to 200 V in step 211 and the situation of the routine goes to step S212. When the input voltage is larger than 110 V, the output voltage of 350 V of the active filter 3 is not changed and the situation of the routine goes to the step S212.

In the step S212, the current-limiting-circuit control portion 13 controls the current limiting circuit 4 to obtain a target discharge lamp voltage, and then reads the discharge lamp voltage outputted from the discharge-lamp-voltage detecting circuit 11. In step S213, the current-limiting-circuit control portion 13 determines a target discharge lamp current in accordance with the discharge lamp voltage and controls the current limiting circuit 4 to keep the electric power of the high-pressure discharge lamp 6 constant.

As described above, the current limiting circuit 4 is feedback-controlled to obtain the target discharge lamp current. Then, the situation of the routine goes back to the step S205 and the above operations are repeated.

Efficiency in the high-pressure discharge lamp lighting apparatus according to Embodiment 1 configured as described above will be described on the basis of Table 1.

TABLE 1

| AC source voltage | Active filter output voltage | Lighting apparatus efficiency | Lighting apparatus loss |
| --- | --- | --- | --- |
| AC 200 V | 350 V | 90% | 17 W |
| AC 100 V | 350 V | 85% | 26 W |
| AC 100 V | 200 V | 90% | 17 W |

Table 1 shows the efficiency of a 150 W-output high-pressure discharge lamp lighting apparatus.

In Table 1, in the case of AC 200 V, the efficiency of the high-pressure discharge lamp lighting apparatus is 90% and the loss in the lighting apparatus is 17 W when the output voltage of the active filter is boosted to 350 V.

In the case where the AC power source voltage is AC 100 V, when the output voltage of the active filter is boosted to 350 V, the efficiency of the high-pressure discharge lamp lighting apparatus is 85% and the loss in the lighting apparatus is 26 W, that is, a large loss occurs in the active filter.

In the case where the AC power source voltage is AC 100 V, however, if the output voltage of the active filter is reduced to 200 V, the loss in the active filter is reduced so that the efficiency of the lighting apparatus is improved to 90% and the loss in the lighting apparatus is reduced to 17 W.

According to Embodiment 1 as described above, even in the case of using 100 V, good starting property can be secured and the same conversion efficiency with a small circuit loss as that in the case of using 200 V can be obtained. Accordingly, the radiation fin can be reduced in size and the apparatus can be reduced both in size and in cost.

In this embodiment, the high-pressure discharge lamp is judged to be stabilized if both the discharge lamp current and the discharge lamp voltage are in predetermined ranges respectively. However, the invention may be applied also to the case where the stable state of the high-pressure discharge lamp is judged on the basis of the fact that the discharge lamp electric power is in a predetermined range.

Embodiment 2

Although Embodiment 1 has been described about a high-pressure discharge lamp lighting apparatus adapted to be used in common for both AC power sources of 100 V and 200 V, Embodiment 2 will be described about a high-pressure discharge lamp lighting apparatus adapted to be used exclusively for an AC power source of 100 V.

The configuration of the high-pressure discharge lamp lighting apparatus of Embodiment 2 is the same as that of Embodiment 1 shown in FIG. 1. The operation of the high-pressure discharge lamp lighting apparatus of Embodiment 2 is similar to that shown in the flow chart of FIG. 3 except that the step S210 is excluded. At least before the discharge lamp goes beyond the glow discharge and shifts to arc discharge, the output voltage of the active filter is kept at 350 V, and after the discharge lamp has shifted to the arc discharge, the output voltage of the active filter is reduced to 200 V.

In such a manner, good starting property is secured and conversion efficiency can be improved.

Embodiment 3

While Embodiments 1 and 2 have been described about the case where the output voltage of the active filter is reduced from 350 V to 200 V rapidly with the input voltage of 110 V as a boundary when the high-pressure discharge lamp becomes stable, Embodiment 3 will be described about the case where the output voltage is changed from 350 V to 200 V gradually and slowly.

The configuration of the high-pressure discharge lamp lighting apparatus of Embodiment 3 is the same as that of Embodiment 1 shown in FIG. 1. The operation of the high-pressure discharge lamp lighting apparatus of Embodiment 3 is similar to that of Embodiments 1 and 2 shown in the flow chart of FIG. 3 except that the operation in the step S211 is changed. Accordingly, only the operation in the step S211 of this Embodiment 3 will be described.

Figure 4:
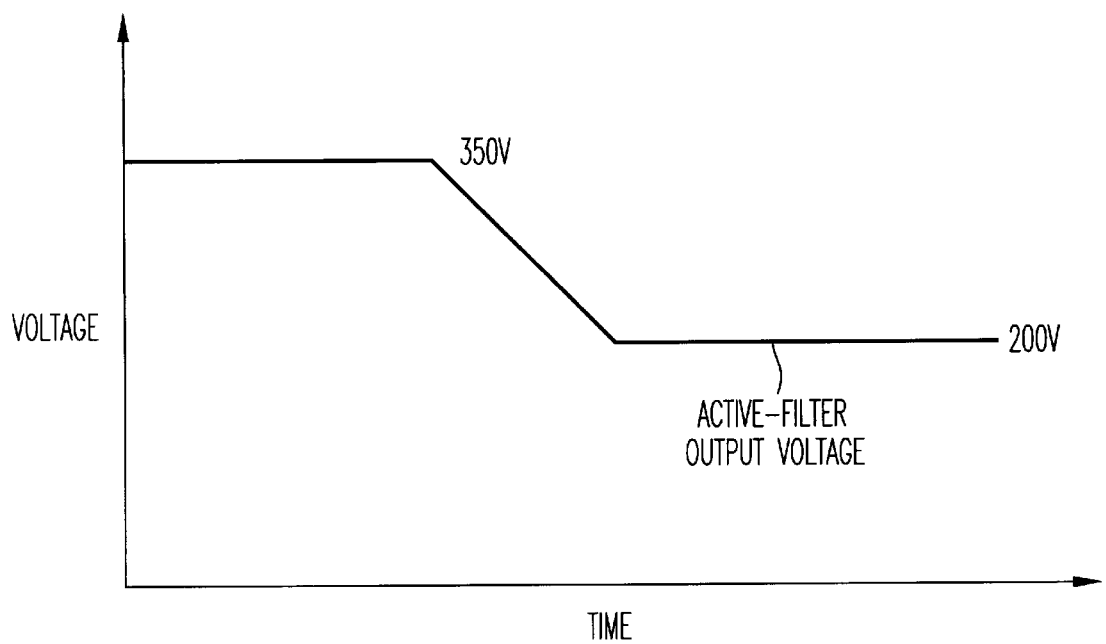
FIG. 4 is a graph for explaining the output voltage of the active filter according to Embodiment 3 of the present invention.

The active-filter control portion 16 of Embodiment 1 shown in FIG. 1 controls the active filter 3 so that the output voltage of the active filter 3 takes a target value, whereas in the step S21 1 in this Embodiment 3, the output voltage of 350 V is changed to 200 V gradually and slowly as shown in FIG. 4 which is a graph for explaining the output voltage of the active filter. Concretely, when the voltage of 350 V is reduced to 200 V, the target output voltage is reduced in the course of 350 V→349 V→348 V→. . . →200 V.

The time required for reduction of the voltage from 350 V to 200 V in this occasion is, for example, 1 second.

The current limiting circuit 4 shown in FIG. 1 controls the discharge lamp current to take a predetermined value. However, if the input voltage is reduced to 200 V, for example, in the condition that the input voltage of the current limiting circuit 4 and the discharge lamp current are controlled to be 350 V and 1.7 A respectively, the control of the current limiting circuit 4 can not catch up with the reduction speed of the input voltage so that the output current of the current limiting circuit 4 is once reduced and then takes 1.7 A. Accordingly, instantaneous flickering of the high-pressure discharge lamp 6 is caused. If the voltage is reduced from 350 V to 200 V slowly so that the control of the current limiting circuit 4 can follow the reduction rate, the output current can be kept in 1.7 A so that the flickering of the high-pressure discharge lamp 6 can be eliminated. Accordingly, instantaneous flickering of the high-pressure discharge lamp 6 can be suppressed.

Embodiment 4

While Embodiment 1 has described about the case where the output voltage of the active filter is determined in two stages, that is, the output voltage of 350 V is not changed when the input voltage is larger than 110 V and the output voltage of 350 V is changed to 200 V when the input voltage is not larger than 110 V, Embodiment 4 related to the case where the output voltage is determined linearly in accordance with the input voltage.

The configuration and operation of the high-pressure discharge lamp lighting apparatus of this Embodiment 4 is similar to those of Embodiments 1 and 2 except that, in this Embodiment 4, an input/output-voltage-relation-graph storage means is further provided in the active-filter control portion 16 in FIG. 1 of Embodiment 1 and the operations in the steps S210 and S211 in the flow chart of FIG. 3 are changed.

Figure 5:
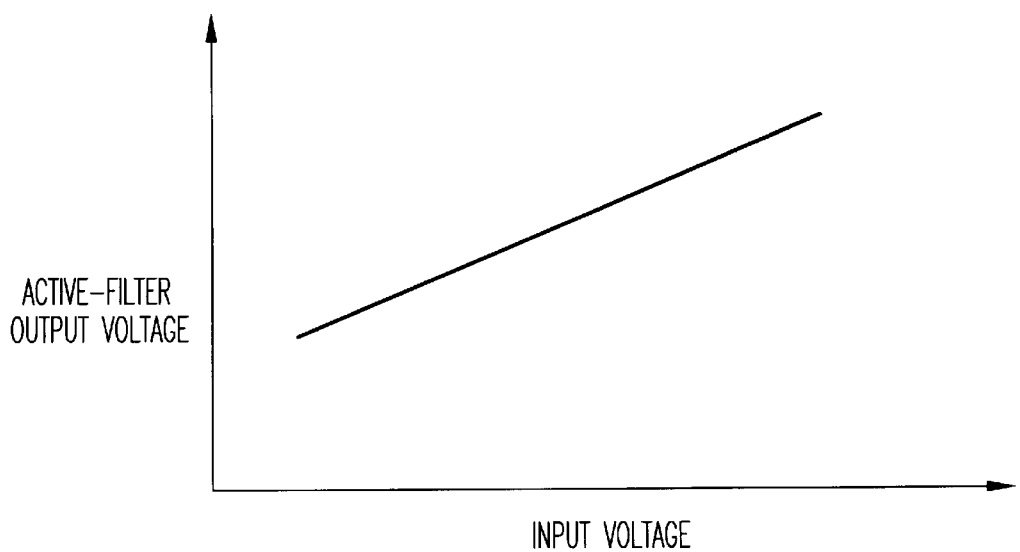
FIG. 5 is a graph showing the relation between input and output voltages of the active filter according to Embodiment 4 of the present invention.
Figure 6:
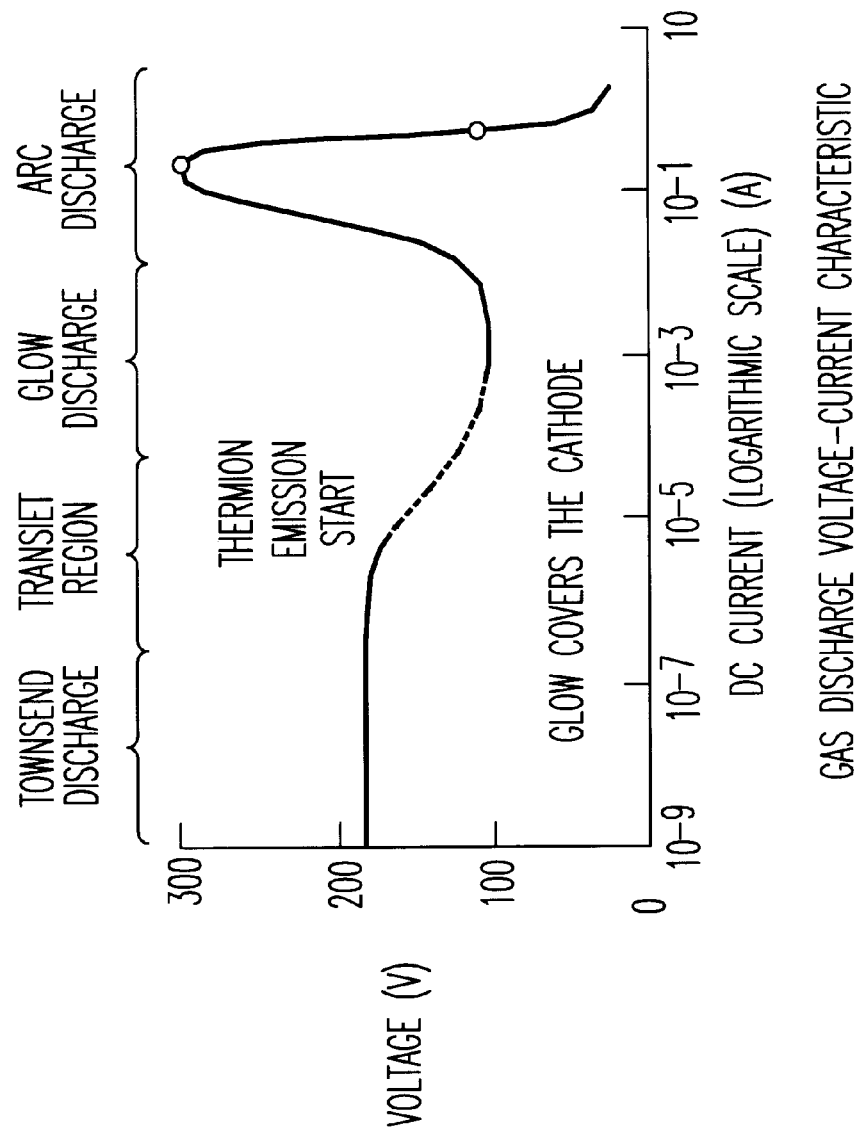
FIG. 6 is a voltage-current characteristic graph of gas discharge of a high-pressure discharge lamp lighting apparatus.

The input/output-voltage-relation-graph storage means provided in the active-filter control portion 16 in FIG. 1 of Embodiment 1 acts to store the input/output voltage relation graph of FIG. 5. As shown in FIG. 5, the relation between the input and output voltages of the active filter 3 is linear.

The operation of this Embodiment 4 is different from the operation of Embodiment 1 in the steps S210 and S211 shown in the flow chart of FIG. 3. Accordingly, the operation of this Embodiment 4 in the steps S210 and 211 will be described.

In this Embodiment 4, the judgment as to whether the input voltage is not larger than 110 V is not made in the step S210 and the "setting of the active filter output voltage to 200 V" in the step S211 in Embodiments 1 and 2 is replaced by "setting of the output voltage corresponding to the input voltage on the basis of the input/output voltage relation graph". That is, the active-filter control portion 16 controls the active filter 3 so that the output voltage of the active filter 3 takes a value corresponding to the input voltage on the basis of the input/output voltage relation graph stored in the input/output-voltage-relation-graph storage means provided in the active-filter control portion 16. As a result, a set voltage is outputted from the active filter 3.

This operation is so designed that the output voltage of the active filter is changed, for example, to 160 V in the case of the input voltage of 90 V, to 180 V in the case of the input voltage of 100 V and to 200 V in the case of the input voltage of 110 V.

In the case of the input voltage of 100 V, the power factor is improved if the voltage is boosted to about 180 V by the active filter. In Embodiments 1 and 2, in the case of the input voltage of 100 V, the voltage is, however, boosted to 200 V. This is because, generally, there is a possibility that the AC voltage of 100 V fluctuates in a range from 90 V to 110 V, and the power factor cannot be improved if the voltage is not boosted to 200 V in the case of the input voltage of 110 V.

When the output voltage is designed to be changed correspondingly to the input voltage as described above, the power factor is improved at the minimum boosting ratio.

In such a manner, the power factor can be improved at the minimum boosting ratio, so that the loss in the active filter can be reduced.

Although the present invention has been described about an apparatus adapted to used in common for AC power sources of 100 V and 200 V, it is a matter of course that the present invention is not limited thereto but applicable to various kinds of AC voltages.

What is claimed is:

1. A high-pressure discharge lamp lighting apparatus comprising:

an active filter for boosting, with a high power factor, an input voltage applied from a rectifier circuit to thereby output a DC voltage;

a current limiting circuit for changing the DC voltage outputted from said active filter to thereby output another DC voltage while keeping electric power of a high-pressure discharge lamp constant;

an inverter for converting the DC voltage outputted from said current limiting circuit into an AC voltage to thereby apply the AC voltage to said high-pressure discharge lamp;

a discharge-lamp-current detecting circuit for detecting a current flowing in said high-pressure discharge lamp;

a discharge-lamp-voltage detecting circuit for detecting the voltage of said high-pressure discharge lamp; and a control means for controlling the output voltage of said active filter in accordance with the input voltage applied to said active filter when not only the discharge lamp current detected by said discharge-lamp-current detecting circuit is in a predetermined range but also the discharge lamp voltage detected by said discharge-lamp-voltage detecting circuit is in a predetermined range.

2. A high-pressure discharge lamp lighting apparatus according to claim 1, wherein said control means reduces the output voltage of said active filter in accordance with the input voltage applied to said active filter.

3. A high-pressure discharge lamp lighting apparatus according to claim 1, wherein said control means reduces the output voltage of said active filter with a predetermined time constant in accordance with the input voltage applied to said active filter.

4. A high-pressure discharge lamp lighting apparatus according to claim 1, wherein said control means reduces the output voltage of said active filter on the basis of an output voltage graph corresponding to the input voltage applied to said active filter.

5. A high-pressure discharge lamp lighting apparatus comprising:

an active filter for boosting, with a high power factor, an input voltage applied from a rectifier circuit to thereby output a DC voltage;

a current limiting circuit for changing the DC voltage outputted from said active filter to thereby output another DC voltage while keeping electric power of a high-pressure discharge lamp constant;

an inverter for converting the DC voltage outputted from said current limiting circuit into an AC voltage to thereby apply the AC voltage to said high-pressure discharge lamp;

a high-voltage pulse generating circuit for generating a high-voltage pulse for starting said high-pressure discharge lamp;

a discharge-lamp-current detecting circuit for detecting a current flowing in said high-pressure discharge lamp;

a discharge-lamp-voltage detecting circuit for detecting the voltage of said high-pressure discharge lamp; and a control means for controlling the output voltage of said active filter in accordance with the input voltage applied to said active filter when not only the discharge lamp current detected by said discharge-lamp-current detecting circuit is in a predetermined range but also the discharge lamp voltage detected by said discharge-lamp-voltage detecting circuit is in a predetermined range.

6. A high-pressure discharge lamp lighting apparatus according to claim 5, wherein said control means reduces the output voltage of said active filter in accordance with the input voltage applied to said active filter.

7. A high-pressure discharge lamp lighting apparatus according to claim 5, wherein said control means reduces the output voltage of said active filter with a predetermined time constant in accordance with the input voltage applied to said active filter.

8. A high-pressure discharge lamp lighting apparatus according to claim 5, wherein said control means reduces the output voltage of said active filter on the basis of an output voltage graph corresponding to the input voltage applied to said active filter.

* * * * *